Dec. 29, 1931.　　　　S. G. MURRAY　　　　1,839,115
SCALE
Filed April 21, 1928　　　4 Sheets-Sheet 1

Fig. 1.

Inventor
Stanley G. Murray
By
Attorney

Dec. 29, 1931.  S. G. MURRAY  1,839,115
SCALE
Filed April 21, 1928  4 Sheets-Sheet 4

Inventor
Stanley G. Murray
By
Attorney

Patented Dec. 29, 1931

1,839,115

UNITED STATES PATENT OFFICE

STANLEY G. MURRAY, OF PASSAIC, NEW JERSEY

SCALE

Application filed April 21, 1928. Serial No. 271,857.

The present invention relates to automatic scales of the general class wherein the feed of the material or substance to be weighed and the discharge thereof after being weighed are performed in sequence under the control of the weighing movements of the scale, and the primary object of the invention is to provide a novel and improved scale of this class whereby the weighing operations, especially when large volumes of material are being weighed, may be accomplished more rapidly than is possible with scales as heretofore constructed and so that the material may flow continuously or substantially so while undergoing weighing.

In carrying out the invention, a plurality of weigh hoppers are employed, and means is provided for filling and emptying them alternately or successively so that one hopper may receive material while another hopper is discharging a weighed charge therefrom, and simple and efficient means are provided for feeding or discharging the material with respect to the different hoppers so that these operations will take the place in proper sequence, the power required to operate the feed and discharge means being supplied by an electric motor or other power device the operation of which is controlled through suitable switches by the weighing movements of the scale and hence positive and certain operation of the feed and discharge means is insured and accuracy in the weighing operations is attained.

To these and other ends, the invention consists in certain improvements and combinations and arrangements of parts all as will be hereinafter more fully described, the features of novelty being pointed out particularly in the claims at the end of the specification.

In the accompanying drawings:—

Similar parts are designated by the same reference characters in the several views.

Scales embodying the present invention are applicable generally to the weighing of materials or substances of various kinds which are capable of flowing under the control of valves or similar control means, the invention being especially applicable to the weighing of liquids of various kinds. The preferred embodiment of the invention is shown in the accompanying drawings and will be hereinafter described in detail, but it is to be understood that the invention is not restricted to the precise construction shown as equivalent constructions are contemplated and such will be included within the scope of the claims.

Figure 1:
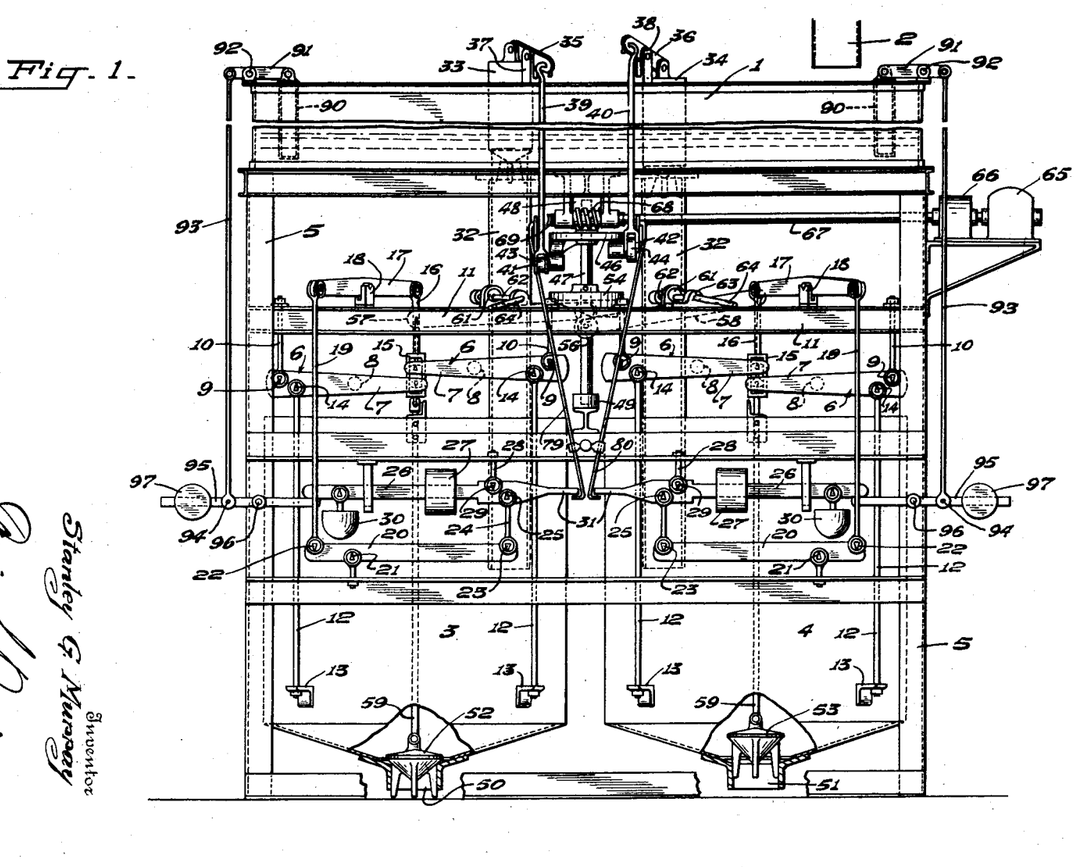
Fig. 1 is a side elevation partly in section, of an automatic scale constructed in accordance with the present invention.
Figures 2, 4, 6:
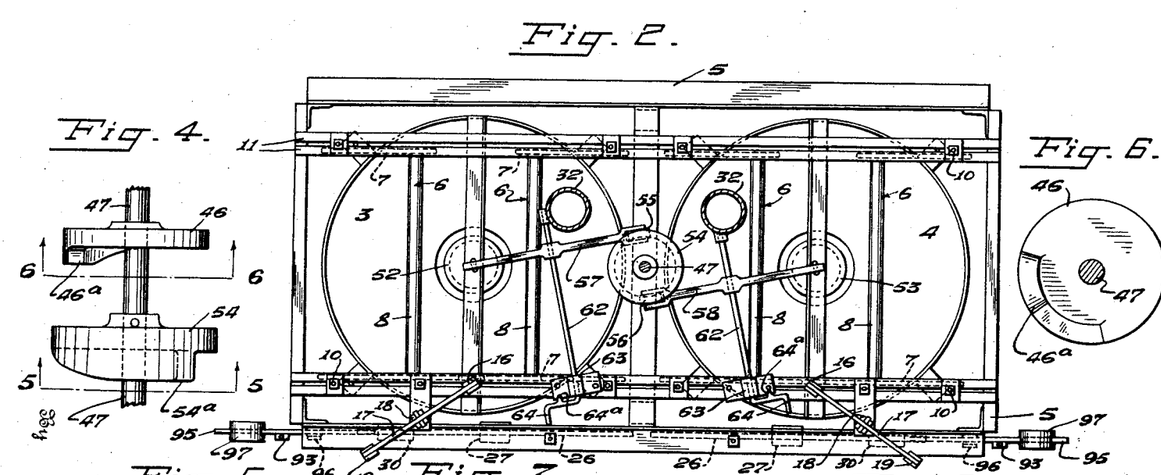
Fig. 2 is a top plan view of the scale shown in Fig. 1.
Fig. 4 is a detail view showing in elevation the cams for controlling the feed and discharge of the material relatively to the weigh hoppers.
Fig. 6 represents a transverse section taken on the line 6—6 of Fig. 4 looking in the direction of the arrows.
Figure 3:
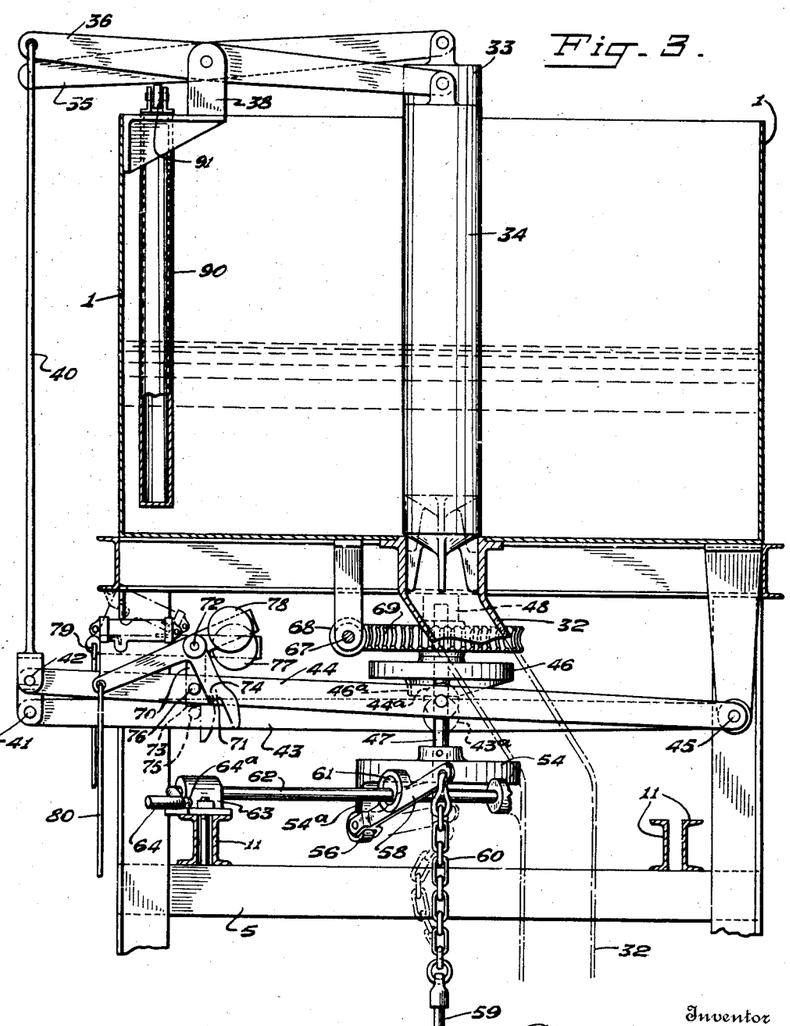
Fig. 3 represents a transverse vertical section through the upper portion of the scale, illustrating the means for feeding and controlling the feed of material to the weigh hoppers.

The scale shown in the present instance is adapted for the weighing of liquids, it comprising a supply tank 1 to which the liquid may be pumped or otherwise fed through a pipe 2, and a pair of weighing tanks or hoppers 3 and 4. The supply tank 1, the weigh hoppers and the controlling and other mechanisms of the scale are supported in a suitable frame 5 which is rigid and may be mounted on any suitable stationary foundation. The weigh hoppers 3 and 4 are supported within the frame by scale or weighing mechanism which may be of any appropriate type. Preferably scale mechanism of the platform type is employed for the suspension of each hopper, and the scale mechanisms for both hoppers may be of similar or duplicate construction. As shown, the scale or weighing mechanism for each hopper comprises a pair of main beams 6 each comprising a pair of arms 7 connected rigidly by a cross bar 8, each beam being suspended by knife edges 9 on its ends which rest in eyes formed in the lower ends of bolts 10, the latter being suspended from channel irons 11 which extend longitudinally in the upper portion of the frame 5 and form a part thereof. Each hopper is suspended from the main weigh beams 6 by rods 12 the lower ends of which are attached to lugs 13 which are secured to the lower portions of the hopper at suitable intervals around its circumference, the upper ends of these rods having eyes which hang on knife edges 14 carried by the arms 7 of the main weigh beams.

In the construction shown, each weigh hopper is in the form of a substantially cylindrical tank and it is supported at four points spaced substantially equidistantly around its circumference, the weight of the tank and also the liquid or material introduced therein being transferred to the system of main weigh beams 6. The arms 7 at one end of the main weigh beams are connected by a block 15 to a rod 16 which is suspended at its upper end from the inner end of a lever 17, this lever having a fulcrum 18 located intermediate of its ends and resting on the side of the frame 5, and a rod 19 is suspended from the outer end of the lever 17 and extends downwardly to a scale lever 20 which is fulcrumed on the main frame at 21, the lower end of the rod 9 being connected to the lever 20 by the knife edge 22 which is located at one side of the fulcrum 21 while the opposite end of the lever 20 carries a knife edge 23 which is engaged by a link 24, the upper end of the latter engaging a knife edge 25 carried by a graduated scale beam 26 which is provided with a poise 27, the beam 26 being fulcrumed on a bracket 28 on the frame 5 by knife edges 29, the beam 26 being also provided with a counterweight 30. The weight of the hopper or the load therein will act through the system of levers or beams described in a direction to raise the end of the beam 26 which carries the counterweight 30, and adjustment of the poise weight 27 along the beam 26 serves to set the scale to bring the beam 26 to a poise when a predetermined quantity of liquid or other material has been introduced into the respective hopper. The scale mechanisms supporting the two hoppers 3 and 4 are identical with the exception that the levers or beams 20 and 26 are in relatively reversed positions, and the inner or adjacent ends of the beams 26 are provided with extensions 31 for a purpose which will be hereinafter described.

A pipe or conduit 32 extends downwardly from the bottom of the tank 1 into each of the hoppers 3 and 4, it being preferable to extend these pipes to the lower portions of the respective hoppers, and the flow of liquid from the tank 1 through these pipes to the resective hoppers is controlled by a pair of valves 33 and 34. These valves are operatively connected to levers 35 and 36 which are fulcrumed intermediately on brackets 37 and 38 which may be mounted on the upper edge of the tank 1 or upon any other suitable support, and the outer ends of the levers 35 and 36 are connected to rods 39 and 40 which extend downwardly and are connected at 41 and 42 to a pair of levers 43 and 44, the latter being pivoted on a fixed axis 45.

The levers 43 and 44 serve to actuate the respective supply valves 33 and 34 and means is provided for operating these levers alternately or successively so that one supply valve will be open to allow liquid to flow to one of the weigh hoppers while the other valve is closed and will prevent the flow of liquid to its respective weigh hopper. As shown in the present instance, a cam 46 is provided for this purpose, it being fixed on a shaft 47 which latter is journalled in bearings 48 and 49 in the main frame so that the cam will rotate with this shaft, and the cam has a projecting portion 46$^a$ at one side of its center which is arranged to engage the roller 43$^a$ on the lever 43 and the roller 44$^a$ on the lever 44 alternately during each revolution of the cam. The portion 46$^a$ of the cam has an incline at its forward side on which the rollers just described ride while passing on to the projecting portion 46$^a$. The riding of one of the rollers on this portion of the cam will force the respective lever downwardly in consequence of which its respective valve will be lifted to unseat it and thereby permit liquid from the supply tank 1 to flow into the respective weigh hopper, and while liquid is being thus supplied to one of the weigh hoppers through the open supply valve, the roller on the other lever will be unaffected by the cam 46 and hence the supply valve controlled by it will be in closed position, thus preventing flow of liquid to the other weigh hopper. The supply valves 33 and 34 have a normal tendency to close, the weight of the valves for example being utilized for this purpose, so that each supply valve after being closed will remain in closed position until it is lifted by the riding of the respective roller on the projecting portion 46ᵃ of the cam 46. The weigh hoppers are provided with discharge openings 50 and 51 in their lower ends through which the weighed charges of liquid are discharged therefrom, and these openings are controlled by valves 52 and 53 which are movable vertically to open and close their respective discharge openings. The discharge valves of the two weigh hoppers are provided with means for opening them alternately so that when one valve is open the other valve will be closed, such means consisting preferably of a cam 54 which is fixed on the shaft 47 to rotate therewith and has a projecting portion 54ᵃ which is arranged to engage alternately a pair of rollers 55 and 56 which are carried respectively on levers 57 and 58 corresponding with the valves 52 and 53 each of these levers being connected to its respective discharge valve by a rod 59 and a chain 60 or other flexible member. Each of the levers 57 and 58 is mounted to rock on an eccentric 61 which is fixed on a shaft 62, and each of the shafts 62 is mounted to rotate in a bearing 63 and is provided at its forward end with a handle or crank 64 which provides means for rotating the respective shaft, a projection 64ᵃ on each crank limiting the rotation of each shaft to half a revolution. By this arrangement, when each shaft 62 occupies one of its two positions, the eccentric 61 thereon will locate the fulcrum for the respective lever 57 or 58 sufficiently high to hold the respective chain 60 under tension so that the discharge valve or valves will open under the action of the cam 54 to discharge the weighed liquid in regular sequence during the operation of the scale, but when it is desired to retain a charge of liquid in one or the other of the weigh hoppers, to enable the weight thereof to be checked for accuracy, the respective shaft 62 is rotated into the opposite position where the eccentric 61 will lower the fulcrum or pivotal center of the lever 57 or 58 to such an extent where sufficient slack will be placed in the chain or flexible member 60 to prevent lifting or opening of the respective discharge valve under the stroke of the lever 57 or 58, such adjustment of the lever 58 being indicated by the dotted lines in Fig. 3. Normally however, the shafts 62 are both set so that the levers 57 and 58 are in their upper operative positions so that as each roller 55 or 56 rides on the projecting portion 54ᵃ of the cam 54, the respective discharge valve 52 or 53 will be opened and held in open position until the portion 54ᵃ of the cam is carried past such roller. The projecting portion 54ᵃ of the cam 54 is located relatively to the portion 46ᵃ of the cam 46 so that when the supply valve of one weigh hopper is open the discharge valve of that weigh hopper will be closed but the discharge valve of the other weigh hopper will be open, and hence one weigh hopper may be filling while the other weigh hopper is empty, but neither supply valve will be open while the discharge valve of the respective weigh hopper is open.

The shaft 47 which imparts rotation to the supply valve controlling cam 46 and discharge valve controlling cam 54 is driven by power which supplies the energy required in opening these valves, and this power is preferably obtained from an electric motor 65 the shaft of which may be connected, through an appropriate speed reduction gearing 66, to a shaft 67 suitably journalled in the main frame 5, and the shaft 67 may be connected to the shaft 47 by a worm 68 on the shaft 67 which meshes with a worm wheel 69 fixed on the shaft 47.

Figures 5, 7:
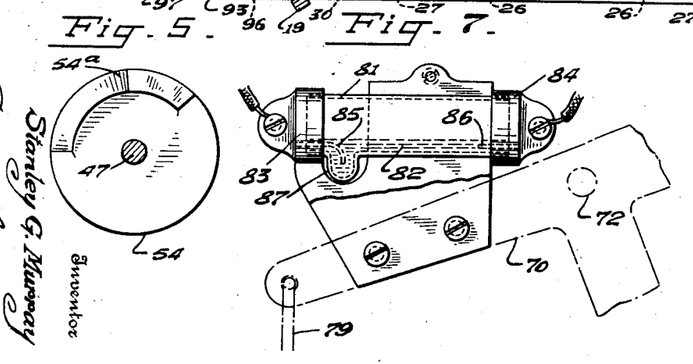
Fig. 5 represents a section taken on the line 5—5 of Fig. 4 and looking in the direction of the arrows.
Fig. 7 is a detail view of one of the electric circuit controlling switches which govern the operation of the operating motor.
Figure 8:
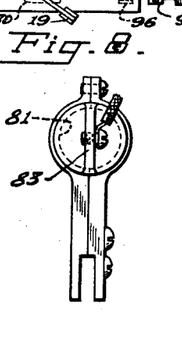
Fig. 8 is an end elevation of the switch shown in Fig. 7 as viewed from the left in said figure.

The cams 46 and 54 are rotated intermittently, through successive half revolutions, under control of the scale mechanisms of the respective weigh hoppers, whereby the supply valve of one weigh hopper will be opened to supply liquid to that weigh hopper while the discharge valve of the other weigh hopper is opened to permit discharge of a previously weighed charge of liquid from that weigh hopper, and after a predetermined weight of liquid has been supplied to the first mentioned weigh hopper to make up a weighed charge of liquid therein, the supply valve for that hopper is automatically tripped by the poising movement of the respective scale mechanism so that its supply valve is closed and, at the same time, the cams 46 and 54 are caused to rotate through another half revolution to open the supply valve of the hopper which was previously discharging its weighed charge and to open the discharge valve of the hopper which has just received a weighed charge of liquid so that the latter may discharge therefrom. The controlling means for effecting this mode of operation consists in the present instance of a pair of triggers 70 and 71 which are pivoted to rock on a relatively fixed axis 72 and have heels 73 and 74 arranged to cooperate with pins 75 and 76 on the levers 43 and 44 respectively. The triggers have counterweights 77 and 78 which act to hold the triggers against the respective pins on the levers 43 and 44 and to hold their heels in engagement with the pins on said levers until dislodged therefrom, the opposite ends of the triggers being connected to rods 79 and 80 which extend downwardly and are bent to lie under the extensions 31 of the respective scale beams 26. When the lever 43 or 44 is pushed downwardly by the cam 46 to open the respective supply valve, the pin 75 or 76 will be carried below the heel 73 or 74 of the respective trigger and the latter will then swing into a position to lock the respective supply valve in open position. Movement of the respective trigger into position to hold the supply valve open will not be interferred with by its rod 79 or 80 at this time as the respective weigh hopper will then be empty and the respective extension 31 on the corresponding scale beam will be raised. The triggers 70 and 71 are utilized to operate electric switches which in turn control the operation of the cam shaft 47. Preferably and as shown in the present instance, each trigger carries a mercury switch which comprises a tube 81 composed of glass or other suitable insulating material, this tube containing a body of mercury 82 and the opposite ends of the tube are closed by metallic heads 83 and 84 which have electrodes 85 and 86 attached thereto, the electrode 86 preferably extending directly into the mercury containing tube while the electrode 85 is curved downwardly into a bulb 87 which is formed in the lower side of the tube 81 and retains a body of mercury. When the respective trigger is in its released position as shown in Figs. 3 and 7, the body of mercury 82 will bridge or connect the electrodes 85 and 86, and an electric circuit is then completed between the metal heads 83 and 84 which may be utilized as circuit terminals for the switch; but when the trigger is rocked into position to retain its respective supply valve in open position, the tube 81 of the switch which rocks with the trigger will assume an inclined position which will cause most of the mercury therein to move to the right hand end of the tube and to separate from the small body of mercury which remains in the well 87, the circuit connection between the heads or terminals 83 and 84 being then interrupted.

Figure 9:
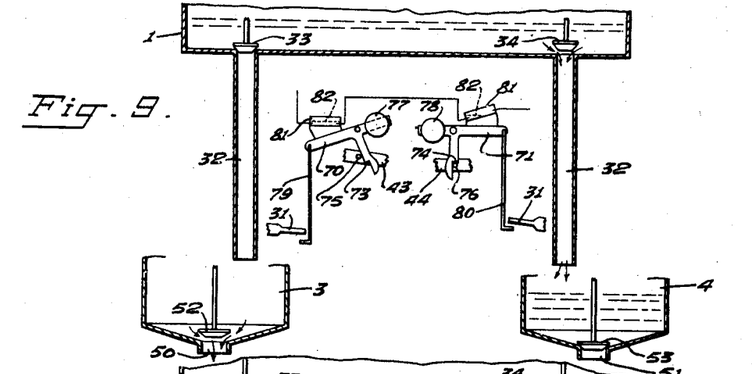
Figs. 9, 10 and 11 are diagrammatic views showing the cycle of operation of the scale.
Figure 10:
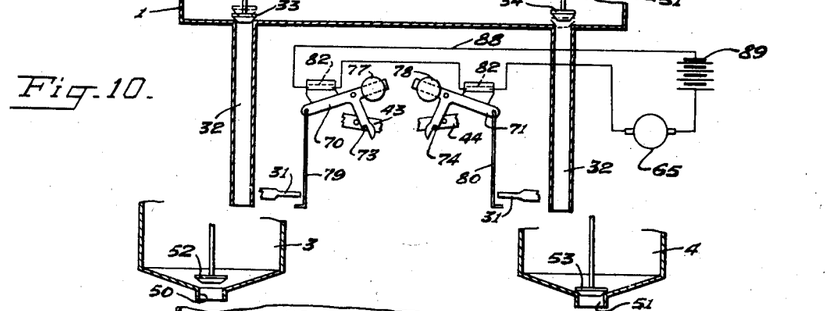
Figure 11:
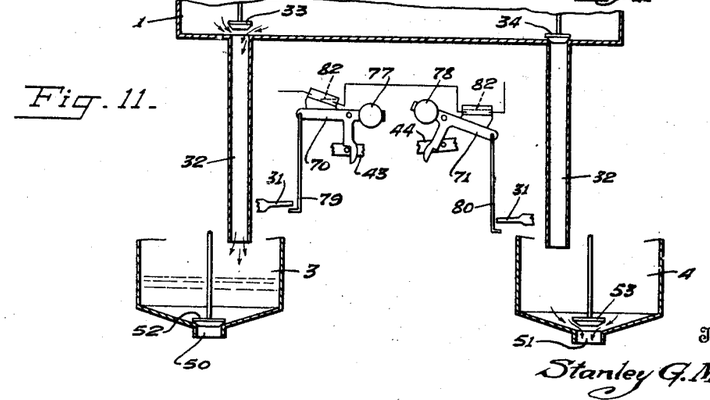

The switches of the two triggers 70 and 71 are connected in series in the circuit 88 which supplies electric current from a suitable source 89 to operate the electric motor 65, the motor circuit being closed or complete when both triggers are in released position as is shown in Fig. 10, in which case the motor 65 will operate to rotate the cams 46 and 54, but the motor circuit will be broken when either of the triggers is in a position to retain its respective supply valve in open position, as will be understood from Figs. 9 and 11, and under those conditions, the motor 65 will be idle and the cams 46 and 54 will be at rest.

It is preferable to provide means to compensate for variations in the velocity of the liquid flowing into one or the other of the weigh hoppers at the moment of closure of the respective supply valves, due to variations in the head of liquid contained in the supply tank 1. Such means as shown in the present instance comprises a float 90, one for each weigh hopper, the float consisting for example of a hollow body or tube closed at its lower end and suspended pivotally at its upper end from a lever 91 which is pivoted at 92 to rock in a vertical plane, the float being suspended so that its lower end is immersed more or less in the liquid contained in the tank 1, depending upon the height of the liquid therein, and the float being of sufficient weight to maintain it in vertical suspended position. The opposite end of the lever 91 is connected pivotally to a rod 93 the lower end of which is pivotally connected at 94 to a lever 95, the latter being pivoted at 96 on the main frame so that one end of this lever is arranged to bear against the under side of the respective scale beam 26, the opposite end of the lever having a counterweight 97 slidably adjustably mounted thereon. By this arrangement, variations in the height of liquid contained in the supply tank 1 will produce variations in the buoyancy or upward thrust of each of the floats 90, and the thrust thus produced by the float will be transmitted through the connections described to the scale beam 26 in a direction which tends to lift its free end or to lower the weigh hopper, and the variations of this thrust, due to variations in the height of the liquid in the supply tank will compensate for the variations in the amount of liquid falling into the respective weigh hopper at the moment of cut-off, due to variations in the height of liquid in the supply tank. Such compensation materially reduces the percentage of error in the accuracy of the weighing operations, particularly when large volumes of liquid are being weighed, and it accommodates the scale to variations which may occur in the rate of flow of the liquid to the supply tank.

The mode of operation of a scale constructed as hereinbefore described is as follows:—

According to Fig. 9, the discharge valve 52 of the weigh hopper 3, which has received a weighed charge of liquid, is open to empty it while the supply valve 33 for this hopper is closed, while the discharge valve 53 of the other weigh hopper 4 is closed and its supply valve 34 is open so that the hopper 4 is receiving liquid to make up a weighed charge therein. At this time, the trigger 70, which was tripped by the descent of the extension 31 of the scale mechanism for the hopper 3, incident to descent of that hopper, will be in disengaged relation with the lever 43 and the latter will be in its raised position corresponding with the closed position of the valve 33, while the trigger 71 will be latched on the lever 44 and the latter will thus be held in its lower position so that the supply valve 34 which is connected to this lever will be held open. The operating circuit for the motor 65 at this time is open so that the motor and the cams driven by it are at rest, the motor circuit being broken by the switch on the trigger 71, as will be clear from Fig. 9.

When a full charge of liquid has been supplied to the weigh hopper 4, corresponding with the weighment for which the poise weight 27 has been set, this weigh hopper will descend, and through the system of scale levers described the extension 31 on the respective scale beam 26 will also descend, it coming into contact with the lower end of the rod 80 and pulling the same downwardly whereby the heel of the latch 71 is tripped off the projection on the lever 44 and is swung into tripped position, and the tripping of the lever 44 causes it to rise immediately and thereby close the supply valve 34, thus cutting off the supply of liquid to this weigh hopper. At this time, both triggers 70 and 71 will be in tripped position and in consequence the switches thereon will close and complete the operating circuit of the electric motor 65 so that the latter will commence to operate and to rotate the cams 46 and 54. Rotation of the cam 54 causes the projecting portion 54ª thereon, which previously engaged the roller 55 on the lever 53 and thereby held the discharge valve 52 of the weigh hopper 3 open, to pass beyond the roller 55, thereby allowing the lever 57 to rock in a direction to close the discharge valve 52 of the hopper 3, and as the cam makes a half revolution, the portion 54ª is brought above the roller 56 and acts to depress it, thereby rocking the lever 58 in a direction to open the discharge valve 53 of the weigh hopper 4. The concurrent rotation of the cam 46 brings the projecting portion 46ª thereon into position to bear on the roller 43ª on the lever 43 and to force this lever downwardly or into the position shown in Fig. 3, thereby lifting and opening the supply valve 33 which is connected to it and serves to supply liquid to the weigh hopper 3. As the lever 43 is thus forced downwardly, its projection 75 is carried below the heel 73 on the respective trigger 70 so that this trigger will swing into its latched position as shown in Fig. 11 where it will hold the lever 43 in its depressed position and will thus maintain the supply valve 33 for this hopper in open position. The weigh hopper 3 will then receive liquid to make up a weighed charge therein, the discharge valve 52 of this hopper having been previously closed by the cam 54 as already described, while the discharge valve 53 of the weigh hopper 4 has been opened to discharge the weighed liquid therefrom and its supply valve 34 is closed, as will be clear from Fig. 11.

Restoring of the trigger 70 to its latched position with the lever 43 tilts the switch on this trigger and thereby breaks or interrupts the operating circuit for the motor 65 which actuates the valve controlling cams, but the cams 46 and 54 do not cease to rotate at the precise instant the motor circuit is broken, as the motor, which runs freely, continues to run until its momentum has been expended, and this continued rotation of the cams is sufficient in practice to carry the projecting portion 46ª of the cam 46 beyond the roller 43ª so that this roller will be free to rise without obstruction from the cam when the time arrives for the closing of its respective supply valve, although the cams will come to rest with the projecting portion 54ª of the cam 54 in engagement with the roller 56 so that the discharge valve 53 of the weigh hopper 4 will be held open to completely discharge the weighed liquid from that weigh hopper.

When sufficient liquid has been supplied to the weigh hopper 3 to make up the full weighment in this hopper, its corresponding scale beam 26 operates through its system of scale levers during which the extension 31 on this scale beam descends and engages and pulls downwardly the rod 79 which trips the trigger 70, thereby releasing the lever 43 so that it may rise and thereby close the supply valve 53, thus cutting off the supply of liquid to this weigh hopper. The movement of the trigger 70 into tripped position brings the switch thereon into circuit-closing position, and as the trigger 71 for the weigh hopper 4 already occupies its tripped position, the circuit of the motor 65 will be closed and the motor will then operate to rotate the cams 46 and 54 through another half revolution, the cam 54 acting to close the discharge valve 53 of the weigh hopper 4 which is then empty and to open the discharge valve 52 of the hopper 3 which has just received a weighed charge, while at the same time the cam 46 rotates to bring its projecting portion 46ª thereon into engagement with the roller 44ª on the lever 44 and to depress this lever and thereby lift and open the supply valve 34 for the hopper 4, and the trigger 71 is moved into its latched position, thereby causing the switch carried by it to tilt and thereby interrupt the motor circuit, the cams however continuing to rotate, under the momentum of the motor, to an extent sufficient to carry the projecting portion 46ª of the cam 46 beyond or clear of the roller 44ª although the projecting portion 54ª of the cam 54 remains in engagement with the roller 55 so as to hold the discharge valve 52 in open position, the parts at this time occupying the relative positions shown in Fig. 9, and when the hopper 4 has received a full weighed charge or liquids, the entire cycle of operations has been completed, and this cycle of operations will be repeated automatically or without the necessity of manual control or other manipulation.

Whenever it is desired to test the weight of a charge in either of the weigh hoppers to check the accuracy of the weighing operation it is only necessary to reverse or rotate the respective crank 64 through a half revolution from its normal position to bring the eccentric 61 thereon into the lower position so that the respective discharge valve operating lever will be correspondingly lowered and will thereby introduce slack into the chain or other flexible valve actuating member 60, as is indicated by the dotted lines in Fig. 3. When the respective weigh hopper has received its full charge and has settled, the corresponding trigger will be tripped to cut off the further supply of liquid thereto and to bring the switch on that trigger into circuit closing position, so that the motor may operate to rotate the supply and discharge valve operating cams, as usual, but the discharge valve for this hopper will not be opened by the cam 54 because of the amount of slack in the chain or connection 60, and hence the weighed charge will remain in this hopper so that its exact weight may be determined by balancing the scale mechanism of the respective hopper and correction of the weighing operation may be made by appropriate adjustment of the respective counterweight or counterweights 97. While discharge of the weighment in this hopper is prevented, the cam 54 continues its rotation until the discharge valve of the other hopper is closed, and hence a weighment in either hopper may be checked or balanced without derangement of the cycle of the machine. Restoring of the reversed crank 64 to normal position effects discharge of the weighed charge and places the machine in condition to resume its normal operation.

By employing a plurality of weigh hoppers or tanks in conjunction with means for filling and emptying them alternately or successively whereby one hopper is receiving a charge of liquid to be weighed while a previously weighed charge is being discharged from another hopper, the weighing of liquids and other fluent materials may be effected rapidly and in large quantities, and the liquid or material to be weighed may flow without interruption to the supply tank or hopper and discharge substantially continuously therefrom, thus avoiding interference with industrial operations or processes in which such liquids or materials may be employed.

As the cams which open the supply and discharge valves are fixed to a common operating shaft, correct timing of the valves is insured, so that neither supply valve can be open while the discharge valve for the same weigh hopper is open, and hence no unweighed liquid will pass through the machine.

Inasmuch as the power required to open the valves is supplied by the motor and the movement of the scale mechanism merely trips the triggers after coming to a poise, no appreciable errors or inaccuracies in the weighing operations arise from the utilization of the scale mechanisms for automatically controlling the operation of the machine.

I claim as my invention:—

1. A scale comprising a plurality of scale supported weigh hoppers, means for supplying material to be weighed successively to said hoppers, means for discharging the weighed material from said hoppers, a rotatable member for operating said supply and discharge means, a motor for rotating said member for operating said supply and discharge means, and means governed by the weighing movements of said hoppers for controlling the operation of said motor.

2. A scale comprising a plurality of scale supported weigh hoppers, means for supplying material to be weighed successively to said hoppers, means for discharging the weighed material from said hoppers, a motor for operating said supply and discharge means, and electrical means governed by the weighing movements of said hoppers for controlling the operation of said motor.

3. A scale comprising a plurality of scale supported weigh hoppers, means for supplying material to be weighed successively to said hoppers, means for discharging the weighed material from said hoppers, an electric motor connected to operate said supply and discharge means, and switches controlled by the weighing movements of said hoppers for governing the operation of said motor.

4. A scale comprising a pair of scale supported weigh hoppers, valves for supplying thereto material to be weighed, a motor for operating said valves to supply material alternately to said hoppers, and electric switches operative concurrently with said valves to control the opertion of said motor.

5. A scale comprising a pair of scale supported weigh hoppers, supply and discharge valves therefor, means operative to open the supply valve for one hopper and to open the discharge valve of the other hopper, a motor for operating said means, and electric switches closed by the weighing movements of said hoppers and opened by the opening movements of the supply valves for starting and stopping said motor.

6. A scale comprising a pair of scale supported weigh hoppers, valves for supplying material thereto to be weighed, means operative to open the supply valves of the hoppers alternately, a motor for operating said means, triggers operative to hold the respective valves in open position and having means for tripping them by weighing movements of the respective weigh hoppers to cause closing of said valves, and switches controlled by said triggers for governing the operation of said motor.

7. A scale comprising a pair of scale supported weigh hoppers, valves for supplying material thereto, electric motor driven means for opening said valves alternately, and circuit controllers governing the operation of said motor, said controllers being actuated by the opening movements of said valves and the weighing movements of the weigh hoppers.

8. A scale comprising a pair of scale supported weigh hoppers, valves for supplying material thereto, electric motor driven means for opening said valves alternately, and circuit controllers governing the operation of said motor, said controllers being actuated to interrupt the motor circuit when the respective valve is opened and to close the motor circuit when the respective weigh hopper settles under the weight of a weighed charge therein.

9. A scale comprising a pair of scale supported weigh hoppers, means for feeding material alternately thereto, motor driven means operative to render said feeding means operative to feed material alternately when said hoppers, and means operative to feed material feeding means is operative to feed material to one or another of said hoppers, to render said motor driven means inoperative and actuated by the weighing movements of the weigh hoppers to render said motor driven means inoperative.

10. A scale comprising a scale supported weigh hopper, a valve for feeding material thereto, electric motor driven means for opening said valve, a trigger set when said valve is opened, to hold the valve in such position, and a switch operative by the setting of the trigger in valve holding position, to interrupt the motor circuit of said motor driven means and operative by the weighing movement of the weigh hopper to close the motor circuit of said motor driven means.

11. A scale comprising a pair of scale supported weigh hoppers, valves for supplying material thereto, electric motor driven means for operating said valves to supply material alternately to said hoppers, a pair of triggers operative to hold the respective valves in open position and having means for tripping them by the weighing movements of the respective hoppers, and switches controlling the motor circuit of said motor driven means and operative by said triggers.

12. A scale comprising a pair of scale supported weigh hoppers, valves for supplying material to the respective hoppers, electric motor driven means for operating said valves to feed material alternately to said hoppers, triggers operative to hold the respective valves in open position, and switches connected to the triggers and operative to close the motor circuit when their respective valves are in closed position and to open said circuit when the respective valves are open.

13. A scale comprising a pair of scale supported weigh hoppers, valves for supplying material to the respective hoppers, electric motor driven means for opening said valves alternately, triggers operative to hold the respective valves in open position and having means for tripping them by the weighing movements of the respective hoppers, and switches connected to said triggers and connected in series in the motor circuit of said motor driven means, said switches being operative to interrupt said circuit when the triggers are in valve holding position and to close said circuit when the triggers are tripped.

14. A scale comprising a pair of scale supported weigh hoppers, supply and discharge valves for the respective hoppers, means for opening the supply valve for one hopper while the supply valve for the other hopper is closed, means for causing closing of the discharge valve for the hopper whose supply valve is open and for opening the discharge valve for the other hopper, and a common driving member connecting said means.

15. A scale comprising a pair of scale supported weigh hoppers, supply and discharge valves for each hopper, a cam operative to open the supply valve for one hopper and to allow closing of the supply valve for the other hopper, and a second cam connected to the cam first mentioned and operative to open the discharge valve of the hopper whose supply valve is closed while the discharge valve of the other hopper is closed.

16. A scale comprising a pair of scale supported weigh hoppers, valves for supplying material thereto, levers for actuating the valves, a cam operative alternately upon said levers to open them, triggers operative to hold the respective valves in open position when moved into such position by the cam, electrically controlled means for operating said cam, including an electric circuit, and switches movable with said triggers and connected in said circuit for controlling it.

17. A liquid weighing scale comprising a scale supported weigh hopper, a tank for supplying liquid thereto, and means subject to the varying heights of liquid in said tank and influencing the scale means of the weigh hopper to compensate it for different heights of liquid in the supply tank.

18. A liquid weighing scale comprising a scale supported weigh hopper, a liquid supply tank therefor, a buoyant body immersed in the liquid in said tank, and means for transmitting the influence of said buoyant body to the scale mechanism of the weigh hopper to compensate it for differences in the height of liquid in the supply tank.

19. A scale comprising a weigh hopper having a discharge valve, a power driven member operative to open said valve to discharge a weighed charge therefrom, and means capable of being set to alter the range of operation of said member and thus prevent opening of said valve during operation of said member, thereby retaining a weighed charge therein.

20. A scale comprising a weigh hopper having a discharge valve, a cam, a lever and flexible member connected to open said valve, and operatively by said cam to open the valve, and means for shifting the fulcrum of said lever to introduce slack in said flexible member and thereby allow operation of said cam while the discharge valve remains closed.

In testimony whereof I have hereunto set my hand.

STANLEY G. MURRAY.